United States Patent [19]

Cho et al.

[11] Patent Number: 5,450,259
[45] Date of Patent: Sep. 12, 1995

[54] CASSETTE LID OPENING AND CLOSING SYSTEM FOR MAGNETIC RECORDING AND REPRODUCING APPARATUS

[75] Inventors: Young H. Cho; Do Y. Choi; Jae K. Seo, all of Suwon, Rep. of Korea

[73] Assignee: Samsung Electronics Co., Ltd., Kyungki-do, Rep. of Korea

[21] Appl. No.: 175,531

[22] Filed: Dec. 30, 1993

[30] Foreign Application Priority Data

Jul. 26, 1993 [KR] Rep. of Korea ............... 1993-14172

[51] Int. Cl.6 ................. G11B 15/675; G11B 15/66
[52] U.S. Cl. ............................... 360/96.6; 360/85
[58] Field of Search ................ 360/96.6, 96.5, 85

[56] References Cited

U.S. PATENT DOCUMENTS 5,327,306  7/1994  Kondo et al. .................. 360/85

Primary Examiner—Robert S. Tupper
Attorney, Agent, or Firm—Sughrue, Mion, Zinn, Macpeak & Seas

[57] ABSTRACT

A cassette lid opening and closing system for a magnetic recording and reproducing apparatus capable of opening a cassette lid during the seating of a tape cassette on a deck and closing it after the seating is accomplished, to thereby lower the height of the deck, includes a lid-open member operating link for swinging a lid-open member to open the cassette lid during the seating of a cassette holder on a slider, a lever for closing the open cassette lid by releasing a lid-pressing operation of the lid-open member when the tape cassette is moved to a seated position on a lower chassis, and a lever operator for operating the lever, so that the cassette lid is closed during recording or reproducing operation. Advantageously, a closed cassette lid allows a corresponding reduction in the size of the deck.

6 Claims, 7 Drawing Sheets

CASSETTE LID OPENING AND CLOSING SYSTEM FOR MAGNETIC RECORDING AND REPRODUCING APPARATUS

BACKGROUND OF THE INVENTION

1. Field of the Invention

The present invention relates to a cassette lid opening and closing system for a magnetic recording and reproducing apparatus. More particularly, the present invention relates to a cassette lid opening and closing system for a magnetic recording and reproducing apparatus, wherein the lid is fully open before seating a tape cassette and then is fully closed following seating of the tape cassette.

Korean Patent Application No. 93-14172 is incorporated herein by reference for all purposes.

2. Description of the Prior Art

Magnetic recording and reproducing apparatuses such as video tape recorders (VTRs) have been developed in various forms. VTRs are now considered a very popular part in our daily lives. Demand is increasing as more and more homes find VTR's to be a staple item.

Generally, these magnetic recording and reproducing apparatuses utilize a ½ inch tape cassette which adopts a video home system (VHS) standard. The magnetic recording and reproducing apparatus often includes a cassette holder into which the tape cassette is inserted, driving members for internally pulling the cassette holder into a body of the apparatus and for seating it on a main deck, means for loading and unloading a magnetic tape within the tape cassette toward a rotary drum installed on the main deck, and means for moving the magnetic tape so as to permit travel along a predetermined path.

Once the tape cassette is inserted into the cassette holder, the insertion is sensed, e.g., by a cassette sensor, and the tape cassette is safely placed on the main deck. Then, the magnetic tape is loaded toward the rotary drum, which is rotating at high speed, by means of a pair of pole bases, to facilitate recording signals to or reproducing signals from the magnetic tape.

Motivated by a desire to increase users' convenience, a product, e.g., a portable camcorder developed by applying the principles by which the above-stated magnetic recording and reproducing apparatus has become smaller and lighter. Furthermore, in order to realize the lightest and smallest package possible, a product adopting an already-developed 8mm tape cassette is generally known to the public.

One factor greatly affecting the size and weight of the product is the deck size. The product can be smaller and lighter according to the rate at which the deck size can be scaled down. The technical level can be measured in view of the scaled-down rate of the deck size. In actual application, magnetic recording and reproducing apparatuses of various types have been studied and developed.

In order to maximally scale down the deck size while simplifying the components, the Applicants of this application filed Korean Patent Application No. 93-5016 on Mar. 29, 1993, relating to a magnetic recording and reproducing apparatus. A corresponding application, International Application No. PCT/KR93/00026, was filed on Apr. 14, 1993, and laid open as Publication No. WO 93/21631 on Oct. 28, 1993. Thus, FIGS. 1A through 1C do not constitute prior art with respect to the instant application.

As shown in FIG. 1A through 1C, a tape cassette is inserted in a cassette holder provided with a rotary drum loading and is accomplished by first inserting a magnetic tape in a cassette holder which is then pressed to be closed, thereby fully-loading the magnetic tape with respect to the rotary drum. Here, the rotary drum is fully contained in the internal space of the tape cassette when the loading of the tape cassette is completed, allowing a very small deck size. The magnetic recording and reproducing apparatus will be schematically described in greater detail below.

FIGS. 1A, 1B and 1C are views illustrating respective operational states of a magnetic recording and reproducing apparatus. The ends of a pair of arms 10a formed by extending to the rear a portion of an eject lever 10 are respectively connected to shafts 11a on the ends of a pair of brackets 11 standing on the interior of a body (not shown) of the apparatus, so that, centered around the shafts 11a, up-and-down operations for opening and closing are carried out.

During an ejecting operation, the eject lever 10 is externally exposed by a predetermined angle with respect to the body while a locking pin 10b, provided on the front of the eject lever 10, is released so that a tape cassette 20 can be inserted into or pulled from the interior of the body. A pair of elastic members 12 are downwardly attached on the inner sides of the eject lever 10, permitting the upper surface of the tape cassette 20 to be pressed and preventing the tape cassette 20 from floating by means of the elastic members 12, while the pressing of the eject lever 10 is finished.

On one side of the arm 10a of the eject lever 10, a pin 10c is formed and fitted into an elongated hole 30b of a bracket 30a standing on the side of an upper chassis 30, thereby vertically moving the upper chassis 30 in the up-and-down directions while the eject lever 10 swings through a predetermined angle. On the inner side of the eject lever 10, a cassette holder 40 for accepting the tape cassette 20, and a slider 50 for horizontally moving the cassette holder 40 in back-and-forth directions are installed. The upper chassis 30 includes a rotary drum 31 and additional elements (not shown), for loading a magnetic tape (not shown) located within the tape cassette 20 during the horizontal movement of the slider 50.

One end of the cassette holder 40 is connected to the end of the slider 50 by means of a shaft 40a, and a first link 41, attached to the approximate center of the cassette holder 40, is connected by a pin 43 to a second link 42, which is slidably moved in an elongated hole 50b formed in a bracket 50a on one side of the slider 50. Therefore, the cassette holder 40 can swing through a predetermined angle about the shaft 40a to permit the insertion and extraction operations of the tape cassette 20.

On either side of the cassette holder 40, a lid-open member 44 is mounted to upwardly and downwardly swing around a shaft 44a, and an elongated hole 44b is formed around the center of the lid-open member 44 to accept guide pin 40b projecting on the side of the cassette holder 40. The center of the lid-open member 44 and the slider 50 are connected by a third link 45, which is inclined by a predetermined angle. The second and third links 42 and 45 are linked together by an elastic member 46.

Accordingly, during placing the cassette holder 40 on the slider 50, the lid-open member 44 swings around the shaft 44a so as to open a lid 20a of the tape cassette 20.

A reel base 51 is mounted on the slider 50, and a reel 53 is installed on the reel base 51 to guide a hub (not shown) of the tape cassette 20. The slider 50 can be moved horizontally, i.e., back and forth, by a slider moving apparatus (not shown) installed on the upper chassis 30.

A lower chassis 60 which supports respective traveling components (not shown) for driving the magnetic tape in the tape cassette 20 is installed beneath the lower portion of the upper chassis 30. The ends of the sides of the upper chassis 30 and lower chassis 60 are respectively connected by pins 60c in such a manner that a pair of fourth and fifth links 60a and 60b, to which the Scott Russel's link mechanism is applied, intersect each other.

An elastic member 61 is provided on a shaft 60d in the center of the fourth and fifth links 60a and 60b to hook the fourth and fifth links 60a and 60b. Therefore, the upper chassis 30 can be elastically moved up and down in a vertical direction.

In the magnetic recording and reproducing apparatus constructed as described above, after the tape cassette 20 is inserted into the cassette holder 40 placed on the inner side of the eject lever 10 and exposed by a predetermined angle to the body of the apparatus (refer to FIG. 1A), the cassette holder 40 is pressed to be closed. Subsequently, the cassette holder 40 swings around the shaft 40a and is placed on the slider 50. At this time, the hub of the tape cassette 20 is guided by the reel 53 installed on the slider 50. The movement of the lid-open member 44, formed on the side of the cassette holder 40, swinging clockwise about shaft 44a opens the lid 20a of the tape cassette 20.

When the cassette holder 40 is pushed toward the upper chassis 30, the slider moving apparatus (not shown) mounted on the upper chassis 30 horizontally moves the slider 50 toward the upper chassis 30 to perform the first loading operation of the magnetic tape with respect to the rotary drum 31, as shown in FIG. 1B.

As shown in FIG. 1C, once the eject lever 10 is pressed to be closed, the eject lever 10 downwardly moves around the shaft 11a and presses the elongated hole 30b of the upper chassis 30 inserted with the pin 10c, so that the upper chassis 30 is elastically and downwardly moved by means of the elastic member 61 installed on the fourth and fifth links 60a and 60b and is to be seated on the lower chassis 60. The locking pin 10b of the eject lever 10 is hooked to a locking device 100 provided on the lower chassis 60.

However, according to the above-described magnetic recording and reproducing apparatus, since the lid 20a is in an open state even after seating the tape cassette 20 on the lower chassis 60, the overall deck height is increased due to the projecting height H of the lid 20a, as shown in FIG. 1C, which hinders the miniaturization and lightening of the deck.

SUMMARY OF THE INVENTION

The principal purpose of the present invention is to provide a deck wherein the deck envelope is optimized with respect to the size of the cassette disposed therein.

An object of the present invention is to provide a cassette lid opening and closing system for a magnetic recording and reproducing apparatus, wherein a lid is open when a tape cassette is being seated on a slider and is closed after the tape cassette is fully placed on a lower chassis.

Still another object of the present invention is to provide a cassette lid opening and closing system for a magnetic recording and reproducing apparatus, wherein the height of a deck is no longer increased to accommodate the height of the lid in the open state, thereby permitting down sizing of the deck.

Yet another object of the present invention is to provide a cassette lid opening and closing system for a magnetic recording and reproducing apparatus so that a smaller and lighter deck can be manufactured.

These and other objects, features and advantages of the present invention are provided by a cassette lid opening and closing system for a magnetic recording and reproducing apparatus including a cassette holder holding a tape cassette and swinging through a predetermined angle around a shaft on one side, a slider having a pair of reels for guiding a hub of the tape cassette during backward and forward movement of the cassette holder in a horizontal direction, and a lid-open member for opening a lid of the tape cassette during seating of the cassette holder on the slider. Preferably, the system further includes a lid-open member operating link which has a first end, elastically supported by a spring, within an elongated hole formed in one side of the slider, and a second end thereof coupled to swing around by the lip-open member for swinging the lid-open member to open the lid when the cassette holder is being seated on the slider. A lever moves the first end of the lid-open member operating link when the tape cassette is seated on a lower chassis to thereby release a lid-pressing operation of the lid-open member and thereby close the open lid of the tape cassette. A lever operator advantageously operates the lever while the tape cassette is being seated on the lower chassis.

According to one aspect of the present invention, in the cassette lid opening and closing system for the magnetic recording and reproducing apparatus, the lever operator includes a roller having a central axis connected to one end of the lever capable of running within an elongated hole formed in the slider. A guide block is installed on the lower chassis to guide the roller and to allow the roller to run within the elongated hole when the tape cassette is being seated on the lower chassis. Furthermore, the guide block has a plane in contact with the roller which is inclined by a predetermined angle to facilitate opening and closing of the lid during unloading and loading the tape cassette.

These and other objects, features and advantages of the invention are disclosed in, or, apparent from the following description of preferred embodiments.

BRIEF DESCRIPTION OF THE DRAWINGS

The above objects and other advantages of the present invention will become more apparent by describing in detail a preferred embodiment thereof with reference to the attached drawings, in which like elements are denoted by like numerals throughout, and in which.

DETAILED DESCRIPTION OF THE PREFERRED EMBODIMENT

Figure 1A:
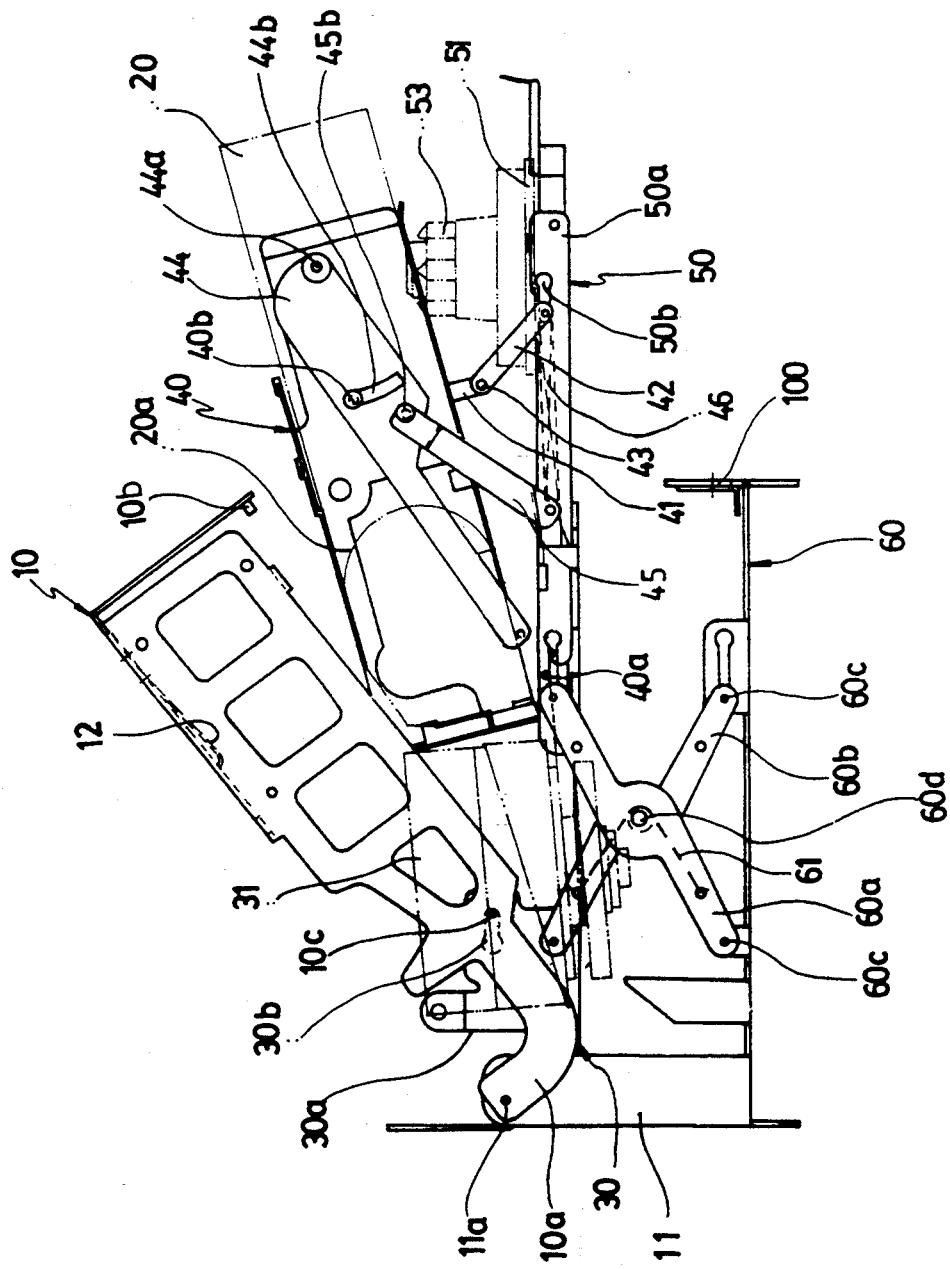
FIGS. 1A, 1B and 1C are side views showing respective operational states of a magnetic recording and reproducing apparatus which are useful in understanding the overall operation.
Figure 1B:
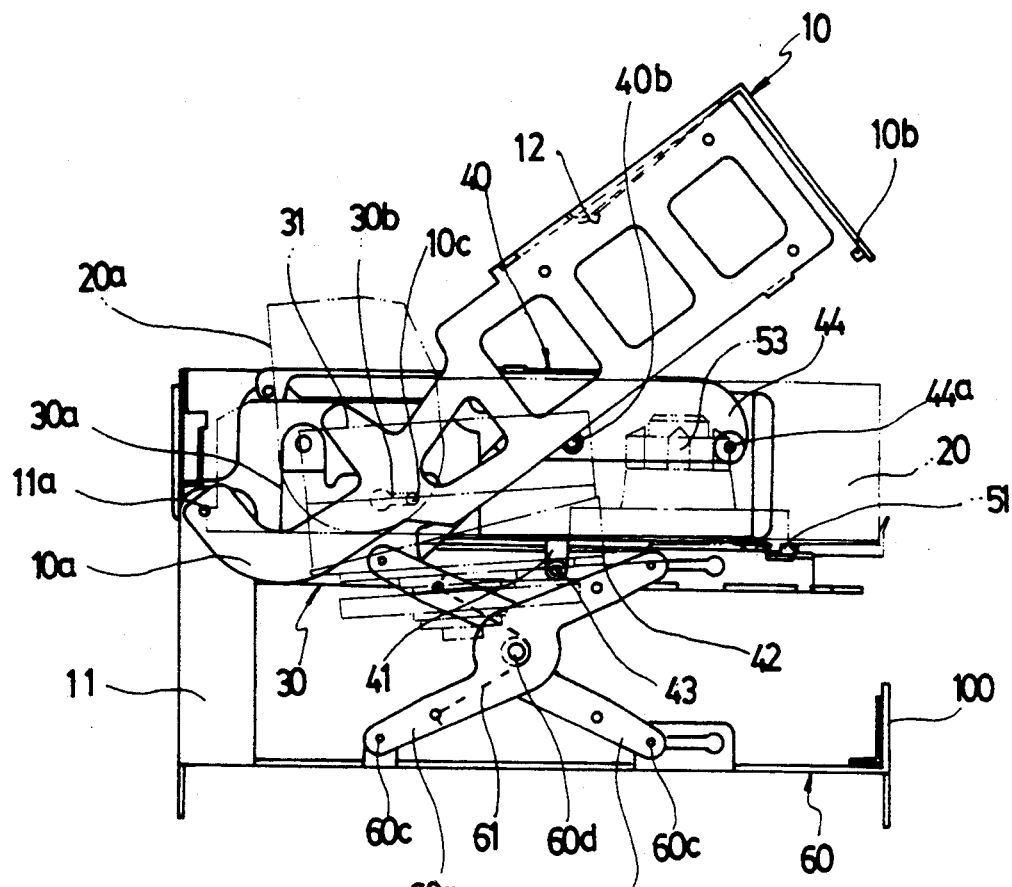
Figure 1C:
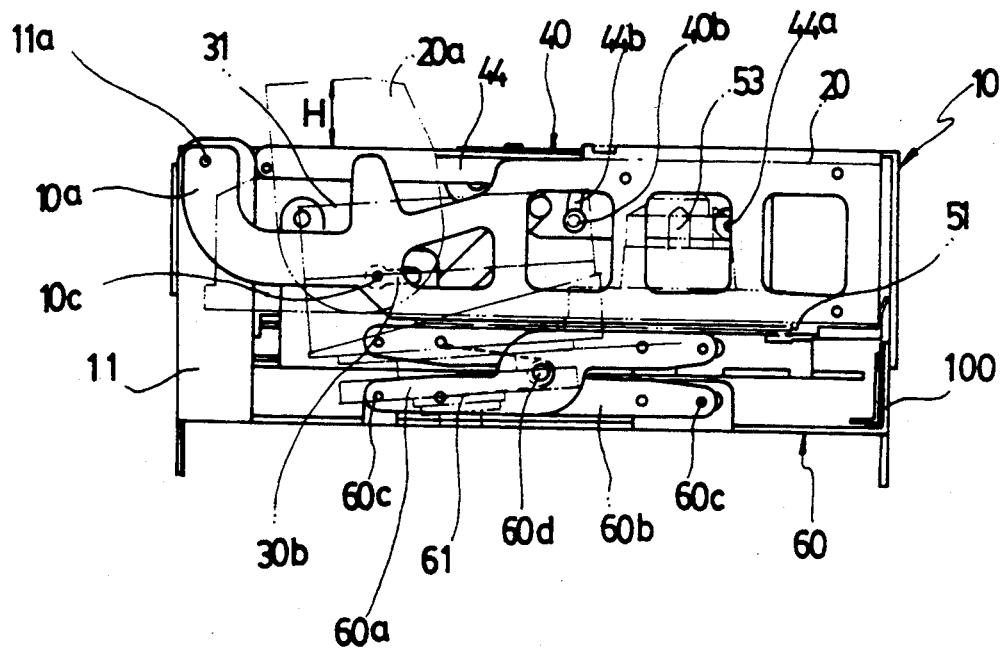

Referring to FIGS. 2A through 2D, the respective operational states of a magnetic recording and reproducing apparatus provided with a cassette lid opening and closing system according to the present invention are schematically illustrated. The same reference numerals used in FIGS. 1A through 1C designate the same parts and, thus, a detailed description will be omitted in the interest of brevity.

A first end of a lid-open member operating link (hereinafter referred to as "link") 45 is elastically supported by a spring 46 within an elongated hole 50c formed in a bracket 50a of a slider 50, and a pin 45a is fixed on the first end. A second end of the link 45 has a lid-open member 44 which can swing by means of a pin 45b.

Figure 2A:
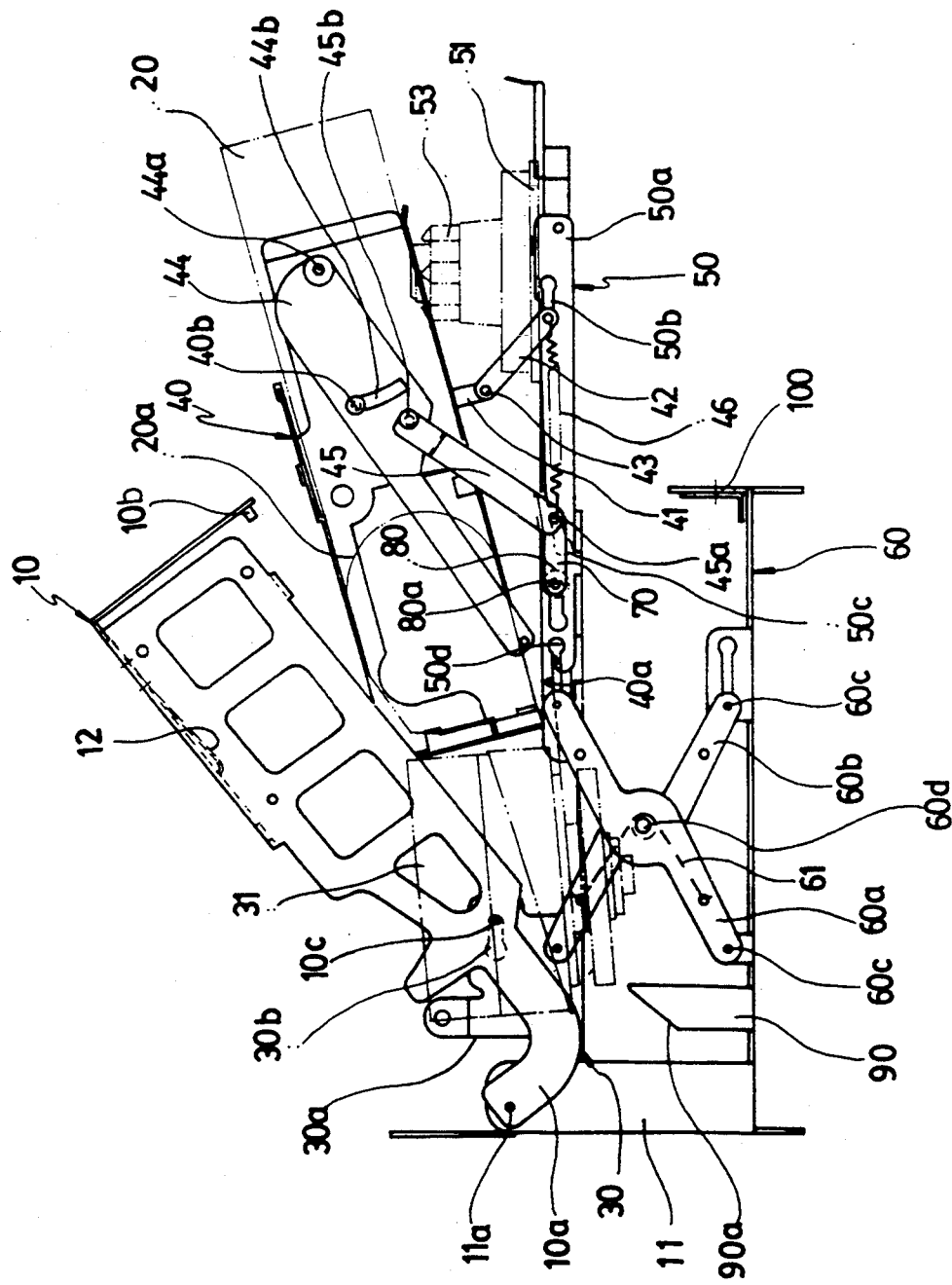
FIGS. 2A through 2D are side views showing respective operational states of a magnetic recording and reproducing apparatus provided with a cassette lid opening and closing system according to the present invention.
Figure 2B:
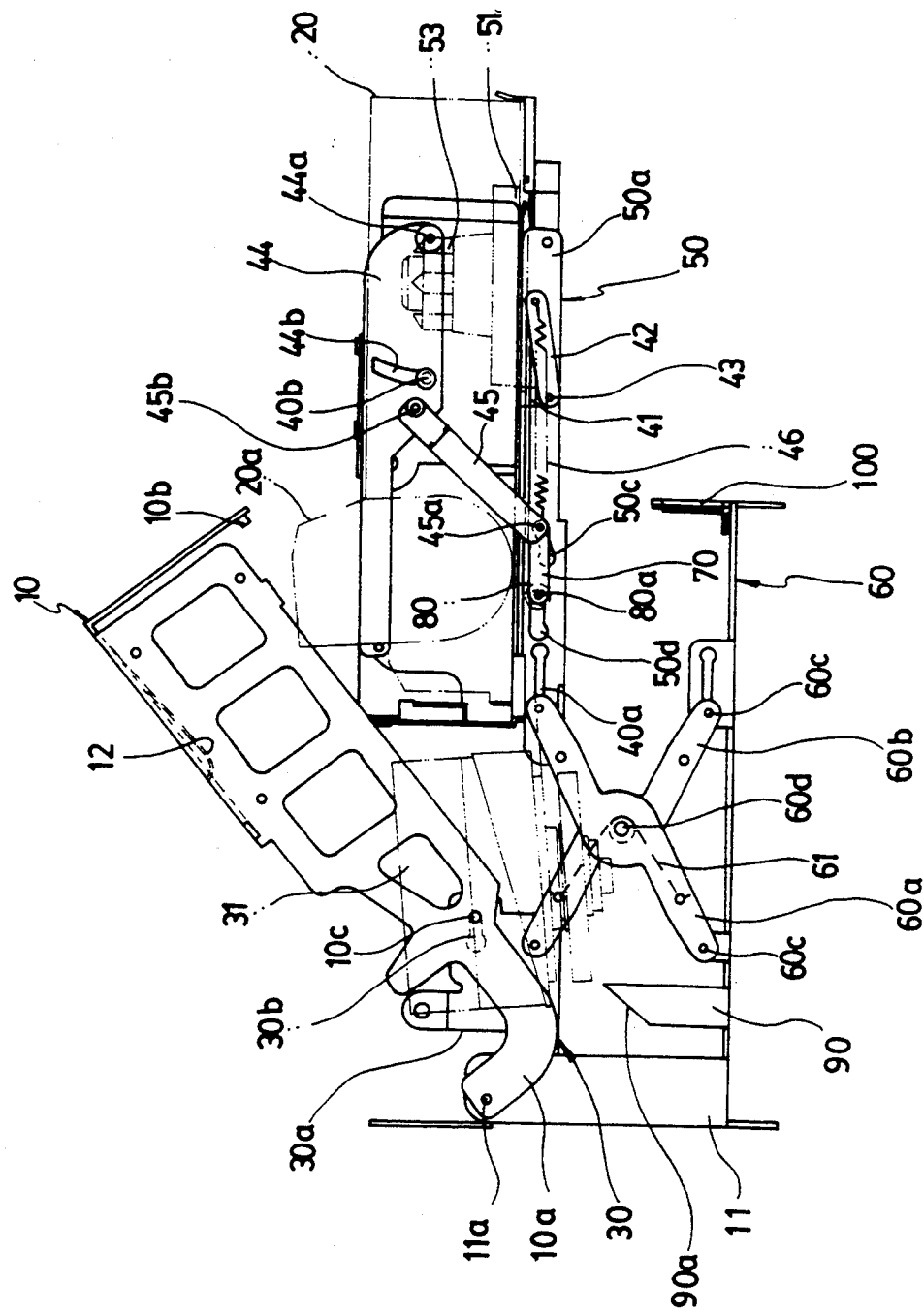
Figure 2C:
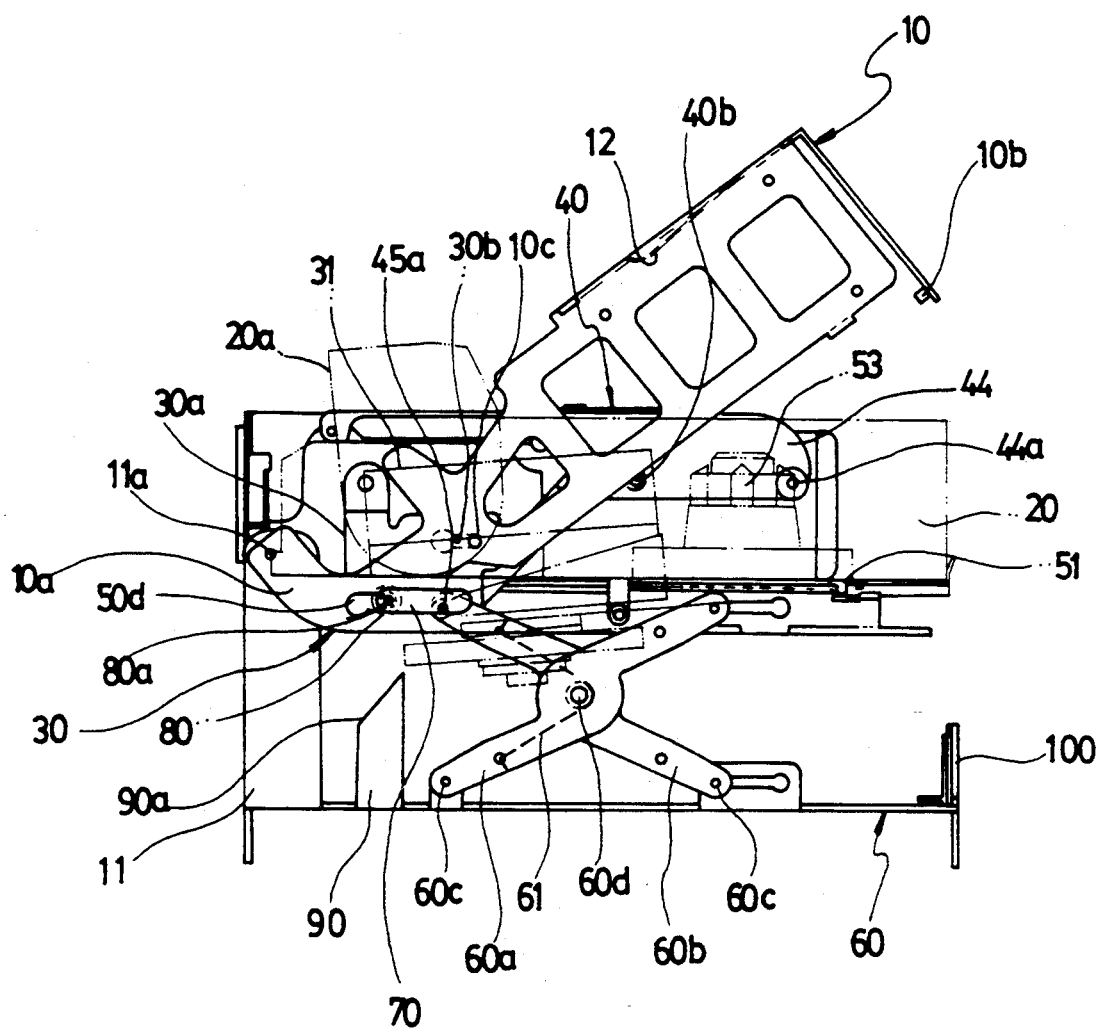

As shown in FIGS. 2A through 2C, the first end of the link 45 is maintained on the right side of the elongated hole 50c by means of the spring 46. In other words, when a tape cassette 20 is inserted in or extracted from a cassette holder 40 (FIG. 2A), the cassette holder 40 is seated on the slider 50 (FIG. 2B), and the slider 50 is positioned above an upper chassis 30 (FIG. 2C), the first end of the link 45 contacts with the right side of the elongated hole 50c by means of the spring 46.

Figure 3:
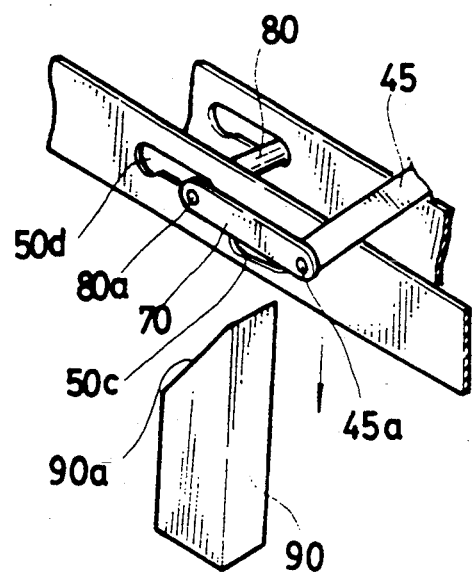
FIG. 3 is a perspective view showing the main part of the cassette lid opening and closing system according to the present invention.

On the other hand, the pin 45a of the first end is connected to one end of a lever 70 for releasing a lid-pressing operation of lid-open member 44 by releasing the first end of the link 45 when the tape cassette 20 is seated on a lower chassis 60, i.e., when the slider 50 is placed above the lower chassis 60. The end of the lever 70 is coupled to a central axis 80a of a roller 80, which is illustrated in FIG. 3. The roller 80 can run within an elongated hole 50d formed in the bracket 50a of the slider 50. Once the roller 80 runs, the pin 45a of the link 45 can be moved within the elongated hole 50c.

Figure 2D:
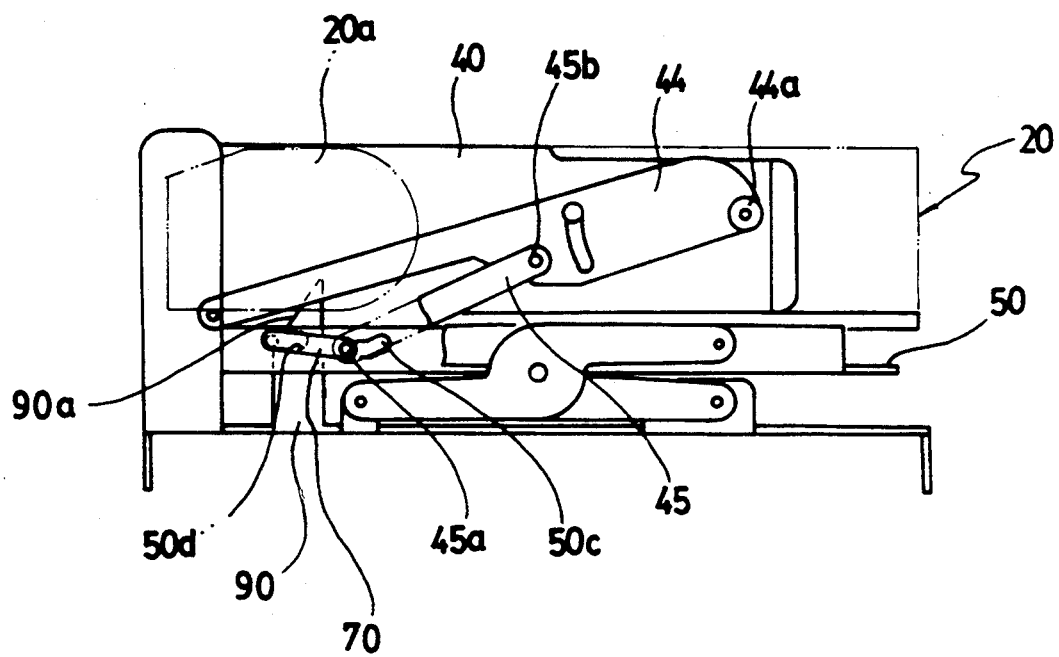

As shown in FIG. 2D, when the slider 50 is seated on the lower chassis 60, the pin 45a of the link 45 is placed on the left end of the elongated hole 50c, so that the link 45 swings the lid-open member 44 counter-clockwise with respect to a shaft 44a to close the open cassette lid 20a by the lid's own spring force.

A guide block 90 is installed on the lower chassis 60 to guide the roller 80 when the upper chassis 30 and slider 50 are seated on the lower chassis 60, thereby permitting the roller 80 to run within the elongated hole 50d. A plane of the face of the guide block 90 contacting the roller 80 is inclined at a predetermined angle to move the roller 80 along an oblique plane 90a of the guide block 90 when the upper chassis 30 and slider 50 are seated on the lower chassis 60. Therefore, the roller 80 is moved to the left end of the elongated hole 50d, which in turn moves the lever 70 to the left. Accordingly, as shown in FIGS. 2A, 2B and 2C, the first end of the link 45 which has been elastically kept on the right end of the elongated hole 50d by means of the spring 46 is moved to the left. At this time, the link 45 forcibly draws the lid-open member 44 down which, therefore, swings counter-clockwise around the shaft 44a to release the operation for pressing the lid 20a, and the lid 20a is automatically closed by its own spring force, as shown in FIG. 2D.

The operation of the cassette lid opening and closing system formed as described above will be discussed in greater detail.

As shown in FIG. 2A, after the tape cassette 20 is inserted into the interior of the cassette holder 40, which is positioned on the inner side of an eject lever 10 and which is exposed, with respect to the body of the apparatus, at a predetermined angle, the cassette holder 40 is pressed to be closed. Then, the cassette holder 40 pivots about shaft 40a and is safely placed on the slider 50. At this time, a hub (not shown) of the tape cassette 20 is guided by a reel 53 installed on the slider 50 to be seated and, simultaneously, the lid-open member 44 swings clockwise around the shaft 44a to open the lid 20a of the tape cassette 20. Preferably, one end of the spring 46 is attached to the pin 45a at the first end of the link 45 to exert an influence thereupon. Thus, the pin 45a of the link 45 is positioned, by being hooked by spring 46, on the right end of the elongated hole 50c, as best seen in FIG. 2B.

As illustrated in FIG. 2C, when the cassette holder 40 is pushed toward the upper chassis 30, the slider 50 is horizontally moved toward the upper chassis 30 by a slider moving apparatus (not shown) mounted on the upper chassis 30. Consequently, the magnetic tape within the tape cassette 20 is first loaded on the rotary drum 31 provided on the upper chassis 30. Then, when the eject lever 10 is pressed to be closed, the eject lever 10 is downwardly moved around the shaft 11a while pressing the elongated hole 30b of the upper chassis 30 connected by the pin 10c, so that the upper chassis 30 elastically descends in a vertical direction under the control of the elastic member 61 installed on fourth and fifth links 60a and 60b and is thereby seated on the lower chassis 60.

Figure 4:
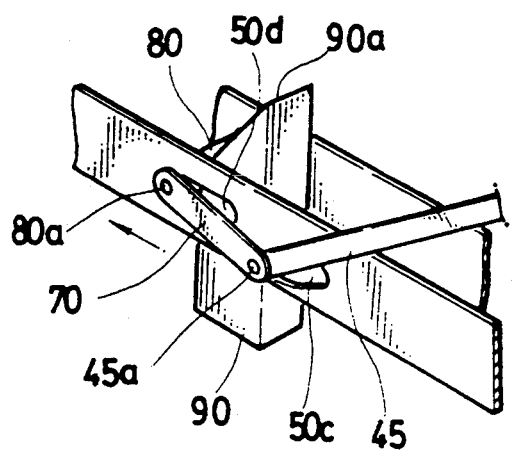
FIG. 4 is a view showing the state of the cassette lid opening and closing system of FIG. 3 before and after being operated.

During the above described seating operation of the upper chassis 30 on the lower chassis 60, as illustrated in FIGS. 3 and 4, the roller 80 is guided along the oblique face 90a of the guide block 90. Therefore, simultaneous with the descent of the upper chassis 30, the roller 80 is moved to the left of the elongated hole 50d by the oblique face 90a of block 90. The movement of the roller 80 toward the left of the elongated hole 50d advantageously permits the lever 70 connected to the shaft 80a of the roller 80 to be moved to the left, which, in turn, moves the pin 45a on the first end of the link 45 to the left. Since the first end of the link 45 is moved to the left, the lid-open member 44 connected to the second end of the link 45 by means of the pin 45b advantageously swings counter-clockwise around the shaft 44a to let the end of the lid-open member 44, i.e., the end opening the lid 20a, go down. Preferably, the lid 20a is closed by its own spring force, thereby achieving the state illustrated in FIG. 2D.

In order to unload the tape cassette 20 from the state as shown in FIG. 2D, when the user releases the eject lever 10, the upper chassis 30 is upwardly moved by the elastic member 61 coupled with the fourth and fifth links 60a and 60b to produce the state shown in FIG. 2C. Preferably, the roller 80 is guided along the oblique face or plane 90a of the guide block 90 by the elasticity of the spring 46.

After being released from contact with the oblique plane 90a of the guide block 90, the roller 80 is advantageously placed on the right end of the elongated hole 50d, so that the link 45 swings the lid-open member 44 clockwise around the shaft 44a. By doing so, the lid 20a advantageously can be open again. If the eject lever 10 is again pressed to be closed during the state shown in FIG. 2C, the roller 80 descends along the oblique plane 90a of the guide block 90 to close the opened lid 20a, as shown in FIG. 2D.

Contrary to the above operation, if the eject lever 10 is released from the state shown in FIG. 2D, the upper chassis 30 is moved upward, e.g., apart from the lower chassis 60 owing to the elastic member 61 coupling the fourth and fifth links 60a and 60b. At this time, the roller 80 is elastically guided by the spring 46 while continuously contacting the oblique plane 90a for the guide block 90. Also, as shown in FIGS. 3 and 4, the roller 80 is moved to the right end of the elongated hole 50d to allow the link 45 to be moved to the right end of the elongated hole 50c by means of the lever 70. Then, the link 45 makes the lid-open member 44 swing to open the closed lid 20a as shown in FIG. 2C.

If the user intends to extract the tape cassette 20 from the cassette holder 40, the slider moving apparatus is elastically operated to pull the slider 50 away from the upper chassis 30 to achieve the state shown in FIG. 2B, wherein, when the user upwardly lifts the cassette holder 40, the lid-open member 44 swings counter-clockwise about the shaft 44a and, by this operation, the lid 20a is closed again by its own elasticity to produce the state shown in FIG. 2A.

According to the cassette lid opening and closing system of the present invention as described above, the lid advantageously becomes open while the tape cassette is being seated on the slider. Then, after the tape cassette is fully seated on the lower chassis, the lid is closed to lower the height of the deck. Advantageously, the deck no longer needs to be as high to accommodate the height of the lid in the open state. Therefore, an extremely thin deck can be designed.

While the present invention has been particularly shown and described with s reference to particular embodiments thereof, it will be understood by those skilled in the art that various changes in form and details may be effected therein without departing from the spirit and scope of the invention as defined by the appended claims.

What is claimed is:

1. A cassette lid opening and closing system for a magnetic recording and reproducing apparatus, the magnetic recording and reproducing apparatus including a lower chassis, an upper chassis mounted for up and down movement with respect to said lower chassis, a slider slidably mounted to the upper chassis for back and forth movement in a horizontal direction with respect thereto, a cassette holder for holding a tape cassette and which includes a shaft fixed on one side thereof for swingably mounting said cassette holder to said slider, said slider having a reel for guiding a hub of said tape cassette during back and forth movement of the cassette holder in the horizontal direction, and a lid-open member for opening a lid of said tape cassette when said cassette holder is being seated on said slider, said cassette lid opening and closing system comprising:

a lid-open member operating link having a first end elastically supported by a spring within an elongated hole formed in one side of said slider and a second end being pivotally mounted to said lid-open member for swinging said lid-open member to open said lid when said cassette holder is being seated on said slider;

a lever which moves said first end of said lid-open member operating link when said tape cassette is being seated on said lower chassis so as to release a lid-pressing operation of said lid-open member, thereby closing the open lid of said tape cassette; and a lever operator operating said lever when said tape cassette is being seated on said lower chassis.

2. A cassette lid opening and closing system as claimed in claim 1, wherein said lever operator comprises:

a roller having a central axis connected to one end of said lever capable of running within a second elongated hole formed in said slider; and a guide block installed on said lower chassis for guiding said roller to allow said roller to run within said second elongated hole when said tape cassette is being seated on said lower chassis.

3. A cassette lid opening and closing system as claimed in claim 2, wherein said guide block has a plane in contact with said roller, said plane being inclined at a predetermined angle to open and close said cassette lid during unloading and loading said tape cassette.

4. A cassette lid opening and closing system for a magnetic recording and reproducing apparatus, the magnetic recording and reproducing apparatus including a lower chassis, an upper chassis mounted for up and down movement with respect to said lower chassis, a slider slidably mounted to the upper chassis for back and forth movement in a horizontal direction with respect thereto, a cassette holder for holding a tape cassette and which includes a shaft fixed on one side thereof for swingably mounting said cassette holder to said slider, said slider permitting back and forth movement of the cassette holder in the horizontal direction with respect to said upper chassis, and a lid-open member, which opens the cassette during seating of said cassette holder on said slider, said system comprising:

a spring;

a lid-open member operating link having a first end elastically supported by said spring and movable within an elongated hole formed in one side of said slider and having a second end pivotally mounted to said lid-open member for selectively opening and closing said lid when said cassette holder is seated on said slider and moved in said horizontal direction with respect to said upper chassis;

a lever permitting movement of said first end of said operating link when moving said upper chassis from a first position to a second position with respect to said lower chassis to thereby release said lid-open member and permit closing of said lid of said tape cassette; and a lever operator for operating said lever when said upper chassis is being moved from said first position to said second position.

5. The cassette lid opening and closing system as claimed in claim 4, wherein said lever operator comprises:

a rolling member having a second shaft connected to one end of said lever, said second shaft being disposed within a second elongated hole formed in said slider; and a guide block connected to said lower chassis for forcibly moving said rolling member with respect to said second elongated hole when said upper chassis is moving between a third position and said second position, wherein said third position is disposed between said first position and said second position.

6. The cassette lid opening and closing system as claimed in claim 5, wherein said guide block has a surface contacting said rolling member when said upper chassis is moving between said third position and said second position.

* * * * *